United States Patent [19]

Williams et al.

[11] Patent Number: 4,852,544

[45] Date of Patent: Aug. 1, 1989

[54] SELF-CLEANING OVEN TEMPERATURE CONTROL WITH MULTIPLE REDUNDANT OVEN TEMPERATURE SENSING ELEMENTS

[75] Inventors: Robert R. Williams; Ronald W. Holling, both of Lincoln Township, Berrien County, Mich.

[73] Assignee: Whirlpool Corporation, Benton Harbor, Mich.

[21] Appl. No.: 139,918

[22] Filed: Dec. 31, 1987

[51] Int. Cl.$^4$ ................................................. F24C 3/00
[52] U.S. Cl. ............................. 126/39 BA; 126/19 R; 236/15 BB; 219/413; 219/490
[58] Field of Search ............. 126/19 R, 39 BA, 39 G; 236/15 A, 15 BB; 219/490, 413, 492

[56] References Cited

U.S. PATENT DOCUMENTS

| | | | |
|---|---|---|---|
| 3,194,227 | 7/1965 | Beach et al. | 126/39 G |
| 3,899,656 | 8/1975 | Smith | 219/413 |
| 3,920,955 | 11/1975 | Nakata | 219/490 X |
| 3,924,101 | 12/1975 | Beard | 219/490 |

Primary Examiner—Larry Jones
Attorney, Agent, or Firm—Mason, Kolehmainen, Rathburng & Wyss

[57] ABSTRACT

An electric range having a self-cleaning oven utilizes a digital electronic microprocessor based oven temperature control system having multiple, redundant oven temperature sensing elements. The output signal from a first one of the multiple oven temperature sensing elements disposed in the cavity of the oven is used as a primary sensed bake temperature signal for controlling the temperature of the oven during its BAKE mode of operation and as a redundant or back-up sensed clean temperature signal for safely shutting down the oven during its CLEAN mode of operation in the event that the sensed oven temperature significantly exceeds the top of the clean temperature range. Correspondingly, the output signal of a second oven temperature sensing element is used as the primary sensed clean temperature signal for controlling the operation of the oven during its CLEAN mode of operation and as a redundant or back-up sensed bake temperature signal for safely shutting down the oven in the event that the sensed oven temperature during the BAKE mode of operation significantly exceeds the top of the bake temperature range. Oven temperature sensing proves associated with the above two temperature sensors may be individually mounted in separate housings in the oven cavity or may be mounted in a single sensor housing in the oven cavity where space or mounting considerations are particularly acute.

23 Claims, 1 Drawing Sheet

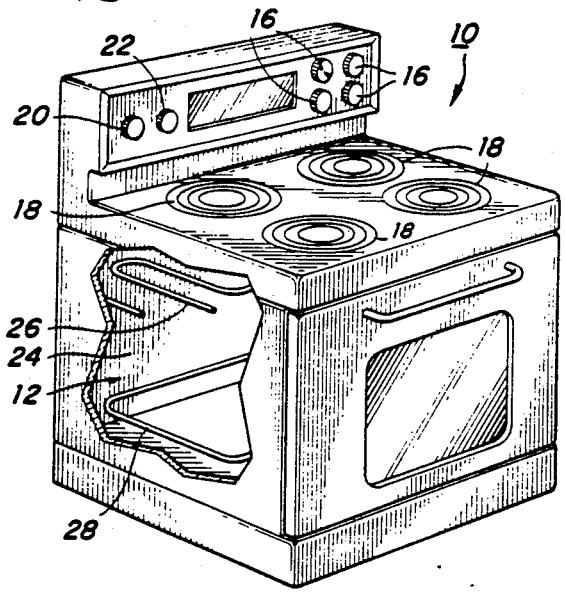
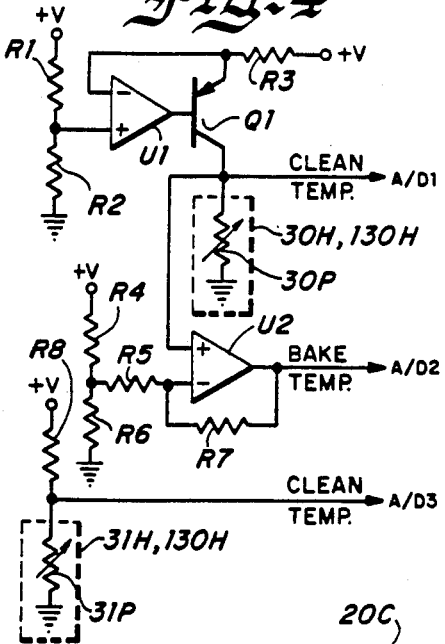
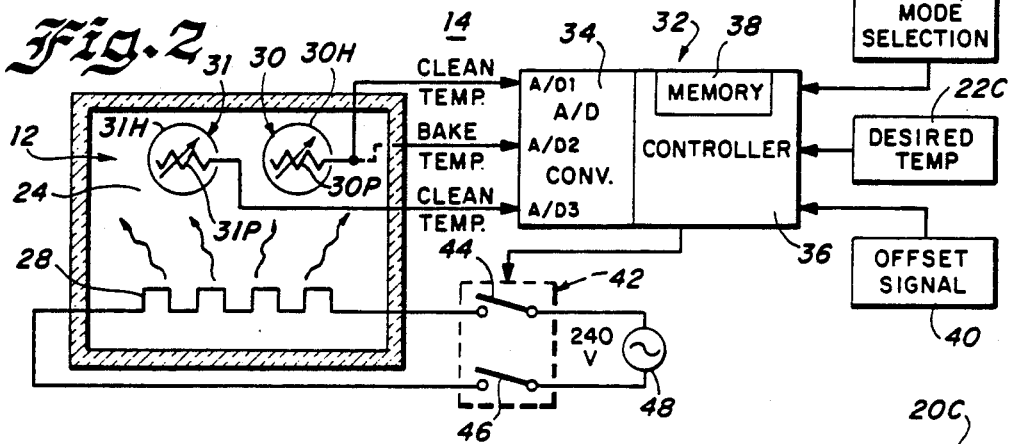
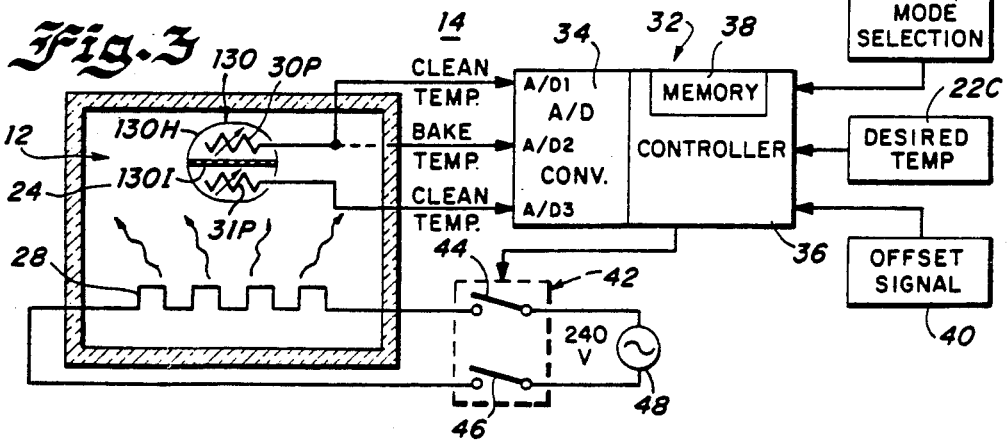

SELF-CLEANING OVEN TEMPERATURE CONTROL WITH MULTIPLE REDUNDANT OVEN TEMPERATURE SENSING ELEMENTS

BACKGROUND OF THE INVENTION

A. Field of the Invention

The present invention generally relates to temperature control systems and methods, and, more particularly, to a new and improved self-cleaning oven temperature control system and method utilizing multiple, redundant oven temperature sensing elements.

B. Description of the Prior Art

Self-cleaning ovens and temperature controls therefor are old and well known in the prior art as exemplified by U.S. Pat. Nos. 3,121,158; 3,122,626; 3,310,654; 3,327,094; 3,353,004; 3,569,670; 3,648,012; 3,738,174; 3,924,101; 4,166,268; 4,214,224; and 4,369,352. Conventionally, the bake temperature controls for many prior art self-cleaning ovens are capable of being recalibrated in service to compensate for oven components that deviate from design specifications or to accommodate individual user preferences. See, for example, the above-identified '670 patent and the '101 patent and the '352 patent. Some prior art temperature control systems for self-cleaning ovens are designed to maintain a constant clean temperature even though the bake temperatures have been recalibrated and offset by a predetermined amount from nominal value. Recalibration of the bake temperatures in order prior art systems necessarily affects the clean temperature.

Modern electric ranges having self-cleaning ovens utilize digital electronic microprocessor based control systems for controlling the oven temperatures. Typically, such ovens include a conventional oven temperature sensor, for example, a temperature sensing probe, disposed in a protective housing in the oven cavity for sensing the oven temperature and for providing an output signal to the microprocessor of the control system for use in controlling the energization of the oven heating elements and, thereby, the temperature of the oven cavity. Therefore, the oven temperature sensor is a critical item in controlling the oven temperature.

Conventionally, when such an oven temperature sensor in an electronically controlled electric range has failed in either an electrically open condition or an electrically shorted condition, either such condition could be and has been detected electronically; and the oven of the range could be and has been safely shut down. However, a conventional oven temperature sensor may also experience a non-catastrophic failure. Specifically, the sensor may drift out of calibration in a manner that could cause the oven temperature to exceed its maximum allowable value requiring it to be shut down immediately for servicing. Therefore, a need exists to detect a variation or degradation in the performance of a conventional oven temperature sensor that is short of a catastrophic failure.

SUMMARY OF THE INVENTION

An object of the present invention is to provide a new and improved self-cleaning oven temperature control system and method.

Another object of the present invention is to provide a new and improved temperature control system and method for a self-cleaning oven in which multiple, redundant oven temperature sensing elements are utilized to detect the variation in or degradation of the performance of an oven temperature sensor used in the BAKE mode or the CLEAN mode, thereby enabling the oven to be safely shut down.

Briefly, the present invention constitutes a new and improved self-cleaning oven temperature control system and method utilizing multiple, redundant oven temperature sensing elements. Specifically, in accordance with the principles of the present invention, an electric range having a self-cleaning oven utilizes a digital electronic microprocessor based oven temperature control system having a pair of temperature sensing elements or probes disposed in the cavity of the oven. A first probe is calibrated to sense temperatures at the top of the bake temperature range and also temperatures in the clean temperature range. That first probe acts as the primary clean temperature sensor when the oven is operated in the CLEAN mode and as a redundant sensor for or check on a second probe that functions as the primary oven temperature sensor when the oven is operating in the BAKE mode. The second probe is calibrated to sense oven temperatures in the normal bake temperature range and also is calibrated to sense temperatures at the top of the clean temperature range. In addition to functioning as the primary oven temperature sensor in the BAKE mode, the second probe functions as a redundant sensor for or check on the first probe when the oven is in the CLEAN mode of operation.

BRIEF DESCRIPTION OF THE DRAWING

The above and other objects, advantages and novel features of the present invention will become apparent from the following detailed description of a preferred embodiment of the present invention illustrated in the accompanying drawing wherein:

FIG. 1 illustrates a self-cleaning electric range having an oven adapted to be controlled by an oven temperature control system and method constructed in accordance with the principles of the present invention;

FIG. 2 is a schematic view of a digital electronic microprocessor based oven temperature control system designed to be operated in accordance with the principles of the present invention;

FIG. 3 is a schematic view of an alternative embodiment of the oven temperature control system of FIG. 2; and FIG. 4 is a more detailed schematic view of the electrical circuit of the oven temperature sensors of FIGS. 2 and 3.

DESCRIPTION OF THE PREFERRED EMBODIMENT

Referring to the drawing and initially to FIGS. 1-3 thereof, therein is illustrated an electric range 10 having a self-cleaning oven 12 adapted to be controlled by a new and improved digital electronic microprocessor based control system 14 and method in accordance with the principles of the present invention. The range 10 includes a plurality of four control knobs 16 for respectively controlling a plurality of four conventional electric burners 18. In addition, the range 10 includes a control knob 20 for controlling the mode of operation of the oven 12, for example, the OFF mode, the BAKE mode, the BROIL mode and the CLEAN mode of operation. The range 10 also includes a control knob 22 to enable the desired oven temperature to be selected by the user of the oven 12. Disposed within a cavity 24 of the oven 12 are a conventional broiling element 26 and a conventional heating element 28. Finally, suitably positioned within the cavity 24 of the oven 12 are at least temperature sensing portions of a plurality of oven temperature sensors 30 and 31 (FIG. 2) of conventional construction, per se, each including a standard oven temperature sensing probe, 30P and 31P, respectively, housed within a protective sensor housing, 30H and 31H, respectively. The probes 30P and 31P may, for example, be commercially available resistance temperature detectors using platinum probe elements exhibiting positive temperature coefficients, i.e., when the oven temperature increases, the electrical resistance of the probe elements also increases.

The digital electronic control system 14 further includes a conventional microprocessor 32 capable of being suitably programmed to effect the desired control of the range 10 and, more particularly with respect to the present invention, the oven 12. Conventionally, the microprocessor 32 includes an analog-to-digital (A/D) converter 34 for receiving multiple analog voltage input signals from the temperature sensors 30 and 31, as discussed in greater detail hereinafter, and for providing suitable digital output pulses or signals to a controller 36 of the microprocessor 32. Conventionally, the microprocessor 32 includes a memory 38 for retaining the programmed instructions for operating the control system 14 including a desired oven temperature control algorithm for controlling the temperature of the oven 12.

The control system 14 further includes an offset signal circuit 40 for providing a desired temperature offset signal to the controller 36 of the microprocessor 32 during a recalibration operation. For example, the offset signal circuit 40 conventionally could take the form of three digital input signals to the controller 36. The three digital input signals may be used to enable a recalibration of the oven bake temperatures in three 7° F. steps for a maximum bake temperature offset during recalibration of ±21° F. Specifically, a first one of the three digital input signals may be used to indicate a desired positive bake temperature offset when, for example, that input signal is low and a desired negative bake temperature offset when, for example, that digital input signal is high. A second one of the three digital input signals may be used to indicate an offset of the bake temperatures of 7° F. when, for example, that input signal is high; and the third input signal may be used to indicate a desired bake temperature offset of 14° F. when, for example, that input signal is high. In this manner, during a recalibration operation, the bake temperatures of the oven 12 may be adjusted by a temperature offset of ±21° F. in three 7° F. steps.

The control system 14 also includes a power switching relay 42 that includes a pair of relay contacts 44 and 46 for switching power to the heating element 28 from a constant voltage (e.g., 240 volts) source 48 of alternating current electric power, under the control of the controller 36. For simplification, only the heating element 28 and the power relay 42 therefor have been illustrated in FIG. 2 in the control system 14. In an actual commercial embodiment, however, the broiling element 26 would obviously also be part of the control system 14 along with its own power switching relay to interconnect the broiling element 26 to the source 48 under the control of the controller 36. The broiling element 26 is used in conjunction with the heating element 28 during the BAKE mode of operation of the oven 12 and may also be used during the CLEAN mode of operation of the oven 12 to distribute heat evenly to the oven 12 under the control of the controller 36.

During the BAKE mode of operation, considering the operation of only element 28 for simplicity, the heating element 28 is energized by the source 48 through the relay 42 under the control of the controller 36 to heat and raise the temperature of items to be cooked within the oven cavity 24 of the oven 12. The sensors 30 and 31 provide output analog voltage signals as inputs A/D 1, A/D 2 and A/D 3 to the A/D converter 34, as discussed hereinafter. Those analog input signals are converted to digital output signals provided to the memory 38 and the controller 36 for controlling the ON-OFF state of the relay 42 and, thereby, the energization of the heating element 28 under the operating control of the oven temperature control algorithm then being executed by the microprocessor 32.

As is conventional, a user of the range 10 selects by means of the control knob 20 the desired mode of operation of the oven 12, which mode selection is provided as an input signal to the microprocessor 32 by a conventional mode selection circuit 20c. If the BAKE mode of operation of the oven 12 has been selected, the user also selects a desired bake temperature by means of the control knob 22, which desired temperature is also provided as an input signal to the microprocessor 32 by a conventional desired temperature circuit 22c. The microprocessor 32 then, through the controller 36, controls the state of the power relay 42 to energize or deenergize the heating element 28 as a function of the actual oven temperature and of the desired temperature as provided by the desired temperature circuit 22c. As a result of a recalibration operation, one or the other of the above temperature signals may be modified by a temperature offset signal from the offset signal circuit 40 and used in controlling the energization of the heating element 28.

Similarly, during the BROIL mode of operation, the broiling element 26 is energized or deenergized through an associated power relay under the control of the controller 36 of the microprocessor 32. If the CLEAN mode of operation is selected, the energization of one or both of the oven heating elements 26 and 28 occurs under the control of the microprocessor 32 to maintain the temperature of the oven 12 at a relatively high level, for example, 870° F.

In accordance with an important feature of the present invention, multiple, redundant temperature sensors 30 and 31 are used to control the operation of the oven 12. Specifically, the two sensors 30 and 31 are used in a unique manner by the microprocessor 32 to detect the non-catastrophic failure of one of the sensors 30, 31, i.e., a drift out of calibration, which, if undetected, could enable the temperature of the oven 12 to exceed its maximum allowable value. More particularly, the sensor 30 is used as the primary bake cycle sensor and also as a redundant or back-up clean cycle sensor. Correspondingly, the senor 31 is used as the primary clean cycle sensor and as a redundant or back-up bake cycle sensor. The sensor 30 provides two, different analog voltage output signals to inputs A/D 1 and A/D 2 of the A/D converter 34. The first signal from the sensor 30 to the input A/D 1 is used as the redundant or back-up sensed clean temperature signal during the CLEAN mode of operation of the oven 12. The other signal from the sensor 30 to the input A/D 2 of the A/D converter 34 is used as the primary sensed bake temperature signal during the BAKE mode of operation of the oven 12. Finally, the analog voltage output signal from the sensor 31 is directed to the input A/D 3 of the A/D converter 34 and is used both as the primary sensed clean temperature signal during the CLEAN mode of operation of the oven 12 and also as the redundant or back-up sensed bake temperature signal during the CLEAN mode of operation of the oven 12. The sensor 30, including its probe 30P and associated circuitry (FIG. 4) suitably mounted in the range 10, for example, on the same circuit board as the microprocessor 32, is calibrated accurately to sense temperatures at the top of the clean temperature range as well as throughout the bake temperature range to allow it to function both as the primary bake temperature sensor and the redundant or back-up clean temperature sensor. Correspondingly, the sensor 31, including the probe 31P and its associated circuitry (FIG. 4) also suitably mounted in the range 10, for example, on the same circuit board as the microprocessor 32, is calibrated accurately at the top of the bake temperature range and throughout the clean temperature range to enable it to function both as the primary clean temperature sensor and as the redundant or back-up bake temperature sensor.

FIG. 3 depicts an alternative embodiment of the control system 14 in which the two separate oven temperature sensors 30 and 31 of FIG. 2 have been combined into a single, multipurpose oven temperature sensor 130. The sensor 130 includes a protective sensor housing 130H in which the oven temperature sensing probes 30P and 31P, in FIG. 2 associated with the sensors 30 and 31 and housed in the housings 30H and 31H, are suitably mounted and electrically insulated from each other by one or more electrical insulating members 130I. The alternative embodiment of FIG. 3 functions in essentially the same manner as the embodiment of FIG. 2 but may, in some instances, be more suitable where space or mounting considerations are particularly acute.

The electrical circuits associated with the temperature sensors 30, 31 and 131 are schematically depicted in FIG. 4. The resistors R1, R2 and R3, the operational amplifier U1 and the transistor Q1 together form a constant current source that allows a maximum temperature signal to be developed across the oven temperature sensing probe 30P disposed within either the housing 30H (FIG. 2) or the housing 130H (FIG. 3). The resistance of the probe 30P varies directly with the temperature of the oven cavity 24. The voltage developed across the probe 30P is provided both as an analog voltage output signal to the input A/D 1 of the A/D converter 34 where it is used by the microprocessor 32 as a redundant or back-up sensed clean temperature signal, and also as an input to the operational amplifier U2. The operational amplifier U2 and the resistors R4, R5, R6 and R7 form an amplifying circuit with, for example, a gain of five, to amplify the input signal to the operational amplifier U2 from the probe 30P and to provide an amplified analog voltage output signal to the input A/D 2 for use by the microprocessor 32 as the primary sensed bake temperature signal for controlling the operation of the oven 12 during its BAKE mode of operation. By amplifying the signal from the probe 30P, the primary sensed bake temperature signal provides more resolution for controlling the broader range of temperatures in the bake temperature range of, for example, between approximately 150° F. and 500° F.

The resistor R8 and the oven temperature sensing probe 31P housed in either the sensor housing 31H (FIG. 2) or the sensor housing 130H (FIG. 3) form a voltage divider for providing a variable analog voltage sensed clean temperature output signal to the input A/D 3 of the A/D converter 34. The analog voltage signal at the input A/D 3 is used by the microprocessor 32 and the preprogrammed oven temperature control algorithm as the primary sensed clean temperature signal for controlling the oven 12 during its CLEAN mode of operation and also as the redundant or back-up sensed bake temperature signal for safely shutting down the oven 12 upon a significant undesirable variance in or degradation in the performance of the probe 30P during the BAKE mode of operation of the oven 12. For example, when the oven 12 is in its BAKE mode of operation and an analog voltage signal is developed across the probe 31P corresponding to a temperature of 600° F. or more, a temperature far outside of the normal bake temperature range, that constantly monitored signal is used by the microprocessor 32 to safely shut down the oven 12 regardless of the signal appearing at the input A/D 2 of the A/D converter 34. Correspondingly, when the oven 12 is in its CLEAN mode of operation, the constantly monitored signal from the probe 30P appearing at the input A/D 1 of the A/D converter 34 is used by the microprocessor 34 safely to shut down the oven 12 when that signal is of a voltage corresponding to a temperature equal to or in excess of, for example, 900° F., a temperature far exceeding the normal clean temperature of the oven cavity 24. Such a signal appearing at the input A/D 1 is used during the CLEAN mode of operation to shut down the oven 12 regardless of the value of the voltage signal appearing at the input A/D 3. In this manner, a new and improved oven temperature control system 14 is provided with built-in oven temperature sensing redundancy to increase even further the operational safety of self-cleaning ovens.

Obviously, many modifications and variations of the present invention are possible in light of the above teachings. For example, with respect to FIGS. 2 through 4, in a further alternative embodiment, the microprocessor 32 may utilize the analog voltage developed across the probe 30P and provided to the input A/D 1 of the A/D converter 34 as the primary sensed clean temperature signal for controlling the temperature of the oven cavity 24 during the CLEAN mode of operation of the oven 12. In this same alternative embodiment, the voltage developed across the probe 30P, as amplified by the operational amplifier U2 and provided to the input A/D 2 of the A/D converter 34, may be used as the primary sensed bake temperature signal for controlling the temperature of the oven cavity 24 during the BAKE mode of operation of the oven 12. In such an alternative embodiment, the voltage developed across the probe 31P and provided to the input A/D 3 of the A/D converter 34 may be used by the microprocessor 32 as a redundant or back-up sensed oven temperature signal in both the CLEAN mode of operation and the BAKE mode of operation of the oven 12 safely to shut down the oven 12 in the event of an undesirable variation in or degradation of the performance of the probe 30P. Thus, it is to be understood that, within the scope of the appended claims, the invention may be practiced otherwise than as specifically described hereinabove.

What is claimed and desired to be secured by Letters Patent is:

1. A self-cleaning oven comprising an oven cavity adapted to receive items to be cooked by said oven, heating means within said oven cavity for raising the temperature of said oven cavity and control means for controlling the operation of said oven in a BAKE mode of operation and in a separate CLEAN mode of operation, said control means including first and second temperature sensing means for sensing the temperature of said oven cavity and also including automated means for controlling the operation of said heating means, said automated means being responsive to output signals from both said first and second temperature sensing means for controlling the operation of said heating means during said BAKE mode of operation and also being responsive to output signals from both said first and second temperature sensing means for controlling the operation of said heating means during said CLEAN mode of operation.

2. A self-cleaning oven comprising an oven cavity adapted to receive items to be cooked by said oven, heating means within said oven cavity for raising the temperature of said oven cavity and control means for controlling the operation of said oven in a BAKE mode of operation and in separate CLEAN mode of operation, said control means including first and second temperature sensing means for sensing the temperature of said oven cavity and also including automated means for controlling the operation of said heating means, said automated means being responsive to output signals from both said first and second temperature sensing means for controlling the operation of said heating means during said BAKE mode of operation and also being responsive to output signals from both said first and second temperature sensing means for controlling the operation of said heating means during said CLEAN mode of operation, said first temperature sensing means including a first oven cavity temperature sensing probe disposed within a first protective housing within said oven cavity.

3. A self-cleaning oven as recited in claim 2 wherein said second temperature sensing means includes a second oven cavity temperature sensing probe disposed within a second protective housing within said oven cavity, said second protective housing being physically distinct and separate from said first protective housing.

4. A self-cleaning oven as recited in claim 3 wherein said first and second oven cavity temperature sensing proves respectively comprise first and second resistance temperature detectors exhibiting positive temperature coefficients.

5. A self-cleaning oven comprising an oven cavity adapted to receive items to be cooked by said oven, heating means within said oven cavity for raising the temperature of said oven cavity and control means for controlling the operation of said oven in a BAKE mode of operation and in a separate CLEAN mode of operation, said control means including first and second temperature sensing means for sensing the temperature of said oven cavity and also including automated means for controlling the operation of said heating means, said automated means being responsive to output signals from both said first and second temperature sensing means for controlling the operation of said heating means during said BAKE mode of operation and also being responsive to output signal from both said first and second temperature sensing means for controlling the operation of said heating means during said CLEAN mode of operation, said first temperature sensing means comprising a first oven cavity temperature sensing probe disposed within a protective housing within said oven cavity and said second temperature sensing means comprising a second oven cavity temperature sensing probe disposed within said protective housing within said oven cavity.

6. A self-cleaning oven as recited in claim 5 wherein said first and second oven cavity temperature sensing probes respectively comprise first and second temperature resistance detectors exhibiting positive temperature coefficients.

7. A self-cleaning oven comprising an oven cavity adapted to receive items to be cooked by said oven, heating means within said oven cavity for raising the temperature of said oven cavity and control means for controlling the operation of oven in a BAKE mode of operation and in a separate CLEAN mode of operation, said control means including first and second temperature sensing means for sensing the temperature of said oven cavity and also including automated means for controlling the operation of said heating means, said automated means being responsive to output signals from both said first and second temperature sensing means for controlling the operation of said heating means during said BAKE mode of operation and also being responsive to output signals from both said first and second temperature sensing means for controlling the operation of said heating means during said CLEAN mode of operation, said first temperature sensing means functioning as the primary means for sensing the temperature of said oven cavity for controlling in conjunction with said automated means the operation of said heating means during said BAKE mode of opeation and as a redundant or back-up temperature sensing means for controlling in conjunction with said automated means the operation of said heating means during said CLEAN mode of operation upon a failure of said second temperature sensing means.

8. A self-cleaning oven as recited in claim 7 wherein said second temperature sensing means functions as the primary means for sensing the temperature of said oven cavity for controlling in conjunction with said automated means the operation of said heating means during said CLEAN mode of operation and also as a redundant or back-up temperature sensing means for controlling in conjunction with said automated means the operation of said heating means during said BAKE mode of operation upon the failure of said first temperature sensing means.

9. A self-cleaning oven as recited in claim 7 wherein said automated means includes an analog-to-digital converter, a microprocessor memory and a microprocessor controller, said first temperature sensing means providing a first analog voltage output signal to a first input of said converter and also providing a second analog voltage output signal to a second input of said converter, said second temperature sensing means providing a third analog voltage output signal to a third input of the said converter, said microprocessor controller utilizing said first and third output signals in controlling the operation of said heating means during said CLEAN mode of operation and also utilizing said second and third output signals in controlling the operation of said heating means during said BAKE mode of operation.

10. A self-cleaning oven comprising
an oven cavity adapted to receive items to be cooked by said oven,
heating means within said oven cavity for raising the temperature of said oven cavity and
control means for controlling the operation of said oven in a BAKE mode of operation and in a separate CLEAN mode of operation,
said control means including first and second temperature sensing means for sensing the temperature of said oven cavity and also including automated means for controlling the operation of said heating means, said automated means being responsive to output signals from both said first and second temperature sensing means for controlling the operation of said heating means during said BAKE mode of operation and also being responsive to output signals from both said first and second temperature sensing means for controlling the operation,
said control means further comprising recalibration means for selectively increasing or decreasing the nominal values of the bake temperatures or said oven cavity during said BAKE mode of operation.

11. A self-cleaning oven comprising
heating means within said oven for raising the internal temperature of said oven and
control means for controlling the operation of said oven in a BAKE mode of operation and in a separate CLEAN mode of operation,
said control means including first and second temperature sensing means for sensing the internal temperature of said oven and also including automated means for controlling the operation of said oven in response to output signals from both said first and second temperature sensing means during said BAKE mode of operation and in response to output signals from both said first and second temperature sensing means during said CLEAN mode of operation.

12. A self-cleaning oven as recited in claim 11 wherein said first temperature sensing means includes a first oven temperature sensing probe disposed within said oven.

13. A self-cleaning oven as recited in claim 12 wherein said second temperature sensing means includes a second oven temperature sensing probe disposed within said oven.

14. A self-cleaning oven comprising
heating means within said oven for raising the internal temperature of said oven and
control means for controlling the operation of said oven in a BAKE mode of operation and in a separate CLEAN mode of operation,
said control means including first and second temperature sensing means for sensing the internal temperature of said oven and also including automated means for controlling the operation of said oven in response to output signals from both said first and second temperature sensing means during said BAKE mode of operation and in response to output signals from both said first and second temperature sensing means during said CLEAN mode of operation,
said first temperature sensing means including a first oven temperature sensing probe disposed within said oven and a first protective housing within which said first oven temperature sensing prove is disposed and said second temperature sensing means including a second oven temperature sensing probe disposed within said oven.

15. A self-cleaning oven as recited in claim 14 wherein said second temperature sensing means includes a second protective housing within which said second oven temperature sensing probe is disposed.

16. A self-cleaning oven comprising
heating means within said oven for raising the internal temperature of said oven,
control means for controlling the operation of said oven in a BAKE mode of operation and in a separate CLEAN mode of operation,
said control means including first and second temperature sensing means for sensing the internal temperature of said oven and also including automated means for controlling the operation of said oven in response to output signals from both said first and second temperature sensing means during said BAKE mode of operation and in response to output signals from both said first and second temperature sensing means during said CLEAN mode of operation,
said first temperature sensing means including a first oven temperature sensing probe disposed within said oven and said second temperature sensing means including a second temperature sensing probe disposed within said oven, and
a protective housing within which both said first and second oven temperature sensing proves are disposed, said first and second probes being electrically insulated from each other within said protective housing.

17. A self-cleaning oven comprising
heating means within said oven for raising the internal temperature of said oven and
control means for controlling the operation of said oven in a BAKE mode of operation and in a separate CLEAN mode of operation,
said control means including first and second temperature sensing means for sensing the internal temperature of said oven and also including automated means for controlling the operation of said oven in response to output signals from both said first and second temperature sensing means during said BAKE mode of operation and in response to output signals from both said first and second temperature sensing means during said CLEAN mode of operation,
said first temperature sensing means including a first oven temperature sensing probe disposed within said oven and said second temperature sensing means including a second oven temperature sensing probe disposed within said oven,
said first temperature sensing means functioning as the primary means for sensing the temperature of said oven for controlling in conjunction with said automated means the operation of said heating means during said BAKE mode of operation and as a redundant or back-up temperature sensing means for controlling in conjunction with said automated means the operation of said heating means during said CLEAN mode of operation upon a failure of said second temperature sensing means.

18. A self-cleaning oven as recited in claim 17 wherein said second temperature sensing means functions as the primary means for sensing the temperature of said oven for controlling in conjunction with said automated means the operation of said heating means during said CLEAN mode of operation and as a redundant or back-up temperature sensing means for controlling in conjunction with said automated means the operation of said heating means during said BAKE mode of operation upon the failure of said first temperature sensing means.

19. A self-cleaning oven as recited in claim 18 wherein said automated means includes an analog-to-digital converter, a memory and a controller, said first temperature sensing means providing a first analog voltage output signal to a first input of said converter and also providing a second analog voltage output signal to a second input of said converter, said second temperature sensing means providing a third analog voltage output signal to a third input of said converter, said controller utilizing said first and third output signals in controlling the operation of said heating means during said CLEAN mode of operation and also utilizing said second and third output signals in controlling the operation of said heating means during said BAKE mode of operation.

20. A self-cleaning oven as recited in claim 19 wherein said control means further comprises recalibration means for selectively increasing or decreasing the nominal values of the bake temperatures of said oven during said BAKE mode of operation.

21. A method of controlling the operation of a self-cleaning oven having heating means for raising the internal temperature of the oven and control means for controlling the operation of the oven in a BAKE mode of operation and in a CLEAN mode of operation, comprising the steps of sensing with a first oven temperature sensor the internal temperature of said oven during said BAKE mode of operation and during said CLEAN mode of operation, sensing with a second oven temperature sensor the internal temperature of said oven during said BAKE mode of operation and during said CLEAN mode of operation, automatically controlling the operation of said heating means in response to output signals from both said first and second temperature sensors during said BAKE mode of operation and automatically controlling the operation of said heating means in response to output signals from both said first and second temperature sensors during said CLEAN mode of operation.

22. A method of controlling the operation of a self-cleaning oven having heating means for raising the internal temperature of the oven and control means for controlling the operation of the oven in a BAKE mode of operation and in a CLEAN mode of operation, comprising the steps of sensing with a first oven temperature sensor the internal temperature of said oven during said BAKE mode of operation and during said CLEAN mode of operation, sensing with a second oven temperature sensor the internal temperature of said oven during said BAKE mode of operation and during said CLEAN mode of operation, automatically controlling the operation of said heating means in response to output signals from both said first and second temperature sensors during said BAKE mode of operation and automatically controlling the operation of said heating means in response to output signals from both said first and second temperature sensors during said CLEAN mode of operation, said first mentioned automatically controlling step including the step of utilizing the output signal from said first temperature sensor as the primary oven temperature sensing signal in controlling the operation of said heating means during said BAKE mode of operation and as a redundant or back-up oven temperature sensing signal in controlling the operation of said heating means during said CLEAN mode of operation upon a failure of said second temperature sensor.

23. A method of controlling the operation of a self-cleaning oven as recited in claim 22 wherein said second mentioned automatically controlling step includes the step of utilizing the output signal from said second temperature sensor as the primary oven temperature sensing signal in controlling the operation of said heating means during said CLEAN mode of operation and as a redundant or back-up temperature sensing signal in controlling the operation of said heating means during said BAKE mode of operation upon a failure of said first oven temperature sensor.

* * * * *